US011685140B2

(12) United States Patent
Paradis

(10) Patent No.: US 11,685,140 B2
(45) Date of Patent: Jun. 27, 2023

(54) NON-WICKING UNDERLAYMENT BOARD

(71) Applicant: JOHNS MANVILLE, Denver, CO (US)

(72) Inventor: Duane Paradis, Highlands Ranch, CO (US)

(73) Assignee: Johns Manville, Denver, CO (US)

(*) Notice: Subject to any disclaimer, the term of this patent is extended or adjusted under 35 U.S.C. 154(b) by 87 days.

(21) Appl. No.: 17/194,464

(22) Filed: Mar. 8, 2021

(65) Prior Publication Data

US 2021/0381259 A1 Dec. 9, 2021

Related U.S. Application Data

(63) Continuation-in-part of application No. 16/893,624, filed on Jun. 5, 2020.

(51) Int. Cl.
*B32B 5/02* (2006.01)
*B32B 5/18* (2006.01)
(Continued)

(52) U.S. Cl.
CPC ................ *B32B 5/26* (2013.01); *B32B 5/022* (2013.01); *B32B 5/028* (2013.01); *B32B 5/18* (2013.01); *B32B 5/245* (2013.01); *B32B 5/28* (2013.01); *B32B 27/065* (2013.01); *B32B 27/12* (2013.01); *B32B 27/36* (2013.01); *E04C 2/205* (2013.01); *E04C 2/22* (2013.01); *E04C 2/246* (2013.01); *E04F 13/075* (2013.01); *E04F 13/077* (2013.01); *E04F 15/182* (2013.01); *B32B 2250/40* (2013.01); *B32B 2255/02* (2013.01); *B32B 2255/20* (2013.01);
(Continued)

(58) Field of Classification Search
None
See application file for complete search history.

(56) References Cited

U.S. PATENT DOCUMENTS 4,388,366 A * 6/1983 Rosato ...................... B32B 5/18 428/401
4,394,411 A * 7/1983 Krull ..................... C04B 28/005 428/218
(Continued)

FOREIGN PATENT DOCUMENTS

CA 2216026 A * 3/1998
CA 2774509 A1 * 10/2013 ............. B32B 27/04
(Continued)

OTHER PUBLICATIONS

Machine Translation of FR-2617220-A3, Dec. 1988 (Year: 1988).*
(Continued)

*Primary Examiner* — Jeffrey A Vonch
(74) *Attorney, Agent, or Firm* — Robert D. Touslee

(57) ABSTRACT

A non-wicking underlayment board and methods for forming the same. The non-wicking underlayment board includes a foam core formed of closed cell foam with reinforcement layers encapsulated within the foam core. Outer facings formed of mineral coated nonwoven fibers are positioned on opposite faces of the non-wicking underlayment panel. The non-wicking underlayment board is useful for efficient and cost effective installation of barriers and surfaces in water-resistant and waterproof environments.

15 Claims, 3 Drawing Sheets

100
102
104
106
106
108

(51) Int. Cl.

| | |
|---|---|
| ***B32B 5/24*** | (2006.01) |
| ***B32B 5/26*** | (2006.01) |
| ***B32B 5/28*** | (2006.01) |
| ***B32B 27/12*** | (2006.01) |
| ***B32B 27/36*** | (2006.01) |
| ***B32B 27/40*** | (2006.01) |
| ***E04C 2/24*** | (2006.01) |
| ***E04F 13/077*** | (2006.01) |
| ***E04F 15/18*** | (2006.01) |
| ***E04C 2/20*** | (2006.01) |
| ***B32B 27/06*** | (2006.01) |
| ***E04F 13/075*** | (2006.01) |
| ***E04C 2/22*** | (2006.01) |
| *E04F 13/18* | (2006.01) |
| *E04F 13/08* | (2006.01) |

(52) U.S. Cl.

CPC ....... *B32B 2255/24* (2013.01); *B32B 2255/26* (2013.01); *B32B 2260/021* (2013.01); *B32B 2260/023* (2013.01); *B32B 2260/046* (2013.01); *B32B 2262/101* (2013.01); *B32B 2266/0214* (2013.01); *B32B 2266/0278* (2013.01); *B32B 2266/08* (2013.01); *B32B 2305/02* (2013.01); *B32B 2305/073* (2013.01); *B32B 2305/08* (2013.01); *B32B 2305/38* (2013.01); *B32B 2305/72* (2013.01); *B32B 2307/54* (2013.01); *B32B 2307/542* (2013.01); *B32B 2307/558* (2013.01); *B32B 2307/718* (2013.01); *B32B 2307/72* (2013.01); *B32B 2307/7265* (2013.01); *B32B 2419/00* (2013.01); *B32B 2419/04* (2013.01); *B32B 2419/06* (2013.01); *B32B 2607/00* (2013.01); *E04C 2/24* (2013.01); *E04C 2/243* (2013.01); *E04F 13/0864* (2013.01); *E04F 13/0866* (2013.01); *E04F 13/18* (2013.01); *Y10T 428/24339* (2015.01); *Y10T 428/24996* (2015.04); *Y10T 428/249956* (2015.04); *Y10T 428/249958* (2015.04); *Y10T 428/249976* (2015.04); *Y10T 428/249977* (2015.04); *Y10T 428/249987* (2015.04); *Y10T 428/266* (2015.01); *Y10T 428/269* (2015.01); *Y10T 442/136* (2015.04); *Y10T 442/143* (2015.04); *Y10T 442/145* (2015.04); *Y10T 442/15* (2015.04); *Y10T 442/16* (2015.04); *Y10T 442/164* (2015.04); *Y10T 442/172* (2015.04); *Y10T 442/183* (2015.04); *Y10T 442/193* (2015.04); *Y10T 442/195* (2015.04); *Y10T 442/197* (2015.04); *Y10T 442/198* (2015.04); *Y10T 442/651* (2015.04); *Y10T 442/652* (2015.04); *Y10T 442/675* (2015.04)

(56) References Cited

U.S. PATENT DOCUMENTS 4,418,108 A * 11/1983 Lin ....................... B32B 17/066 442/370
4,637,951 A * 1/1987 Gill ......................... D04H 5/12 428/338
4,640,864 A * 2/1987 Porter ................... B32B 29/007 156/182
4,642,950 A * 2/1987 Kelly ...................... E04G 23/02 52/90.2
4,681,798 A * 7/1987 Gill ........................ D04H 1/587 428/338
4,764,420 A * 8/1988 Gluck ................... B29C 44/326 427/373
4,784,897 A * 11/1988 Brands ..................... D06N 5/00 428/328
5,102,728 A * 4/1992 Gay ...................... B29C 70/003 428/489
5,112,678 A * 5/1992 Gay ...................... B29C 70/003 442/373
5,140,789 A * 8/1992 De Gooyer .............. A47K 3/40 4/613
5,144,782 A * 9/1992 Paquette ............. E04D 13/1687 52/14
5,314,530 A * 5/1994 Wierer ..................... D06N 5/00 106/18.21
5,578,363 A * 11/1996 Finley ..................... E04F 15/18 428/95
5,698,304 A * 12/1997 Brandon ................. B32B 27/32 428/215
5,717,012 A * 2/1998 Bondoc .................... C08K 7/02 524/13
5,846,462 A * 12/1998 Thompson ............ B29C 44/461 261/DIG. 26
5,891,563 A * 4/1999 Letts ....................... B32B 27/20 428/140
6,030,559 A * 2/2000 Barry .................... B29C 44/332 264/273
RE36,674 E * 4/2000 Gluck ....................... B32B 5/18 264/45.3
6,044,604 A * 4/2000 Clayton .................. E04C 2/246 52/794.1
6,058,659 A * 5/2000 Astrom ............. E04F 15/02188 52/302.1
6,093,481 A * 7/2000 Lynn ....................... B32B 33/00 428/317.9
6,306,920 B1 * 10/2001 Heinemann .......... C08G 18/482 521/131
6,341,462 B2 * 1/2002 Kiik ......................... D06N 5/00 428/480
6,355,701 B1 * 3/2002 Soukup ............... B29C 44/3415 521/137
6,368,991 B1 * 4/2002 Horner, Jr. ................ E04B 1/80 442/76
6,656,858 B1 * 12/2003 Cahill ..................... E04C 2/296 428/512
6,838,163 B2 * 1/2005 Smith ................... B32B 17/067 428/312.4
7,763,134 B1 * 7/2010 Kumar .................... B32B 13/12 428/317.1
10,000,922 B1 * 6/2018 Letts ..................... B32B 27/304
10,533,323 B2 1/2020 Nielsen et al.
10,870,987 B1 * 12/2020 Letts ........................ C08J 9/142
2002/0012785 A1 * 1/2002 Leduc ....................... B32B 5/18 428/317.1
2002/0124306 A1 * 9/2002 Smale ..................... E04F 15/02 4/613
2004/0014382 A1 * 1/2004 MacAulay ............. E04C 2/296 442/16
2004/0053035 A1 * 3/2004 Haas ........................ B32B 5/18 264/45.4
2004/0072487 A1 * 4/2004 Neumann ........... B28B 19/0092 442/79
2005/0042436 A1 * 2/2005 Glorioso ................... B32B 5/26 428/311.11
2005/0055975 A1 * 3/2005 Tackett .................... G01N 3/08 52/741.1
2005/0097857 A1 * 5/2005 Mehta ................... E04D 12/002 52/782.1
2005/0233657 A1 * 10/2005 Grove .................... D06N 3/042 442/44
2005/0260400 A1 * 11/2005 Schweitzer ............... B32B 5/18 52/309.4
2005/0266225 A1 * 12/2005 Currier ................ D06N 7/0002 428/297.4
2006/0019568 A1 * 1/2006 Toas .......................... E04B 1/80 442/381
2006/0035032 A1 * 2/2006 Murphy ................ C03C 25/465 427/372.2

(56) References Cited

U.S. PATENT DOCUMENTS

2006/0096205 A1* 5/2006 Griffin ...................... E04D 3/18 52/309.4
2006/0101777 A1* 5/2006 Lapointe ............. E04D 13/1693 52/404.1
2006/0213006 A1* 9/2006 Rush, Jr. .................. A47K 3/40 4/613
2006/0275561 A1* 12/2006 Agrawal ................. E04D 3/351 428/2
2006/0276093 A1* 12/2006 Agrawal ................... B32B 5/18 442/374
2009/0035550 A1* 2/2009 Schlueter ................ B32B 27/12 428/312.2
2009/0110885 A1* 4/2009 Paradis ................... E04B 1/625 156/77
2009/0155603 A1* 6/2009 Zheng ..................... B32B 17/02 428/428
2009/0277113 A1* 11/2009 Taraba ................ E04D 13/0481 52/302.1
2009/0311932 A1* 12/2009 Hughes ..................... B32B 1/00 264/261
2010/0064613 A1* 3/2010 Rykkelid ................. E04C 2/22 52/506.01
2011/0008629 A1* 1/2011 Davidson ................ B32B 5/245 156/60
2011/0072736 A1* 3/2011 Gullett ................ E04D 13/1693 52/302.1
2011/0214387 A1* 9/2011 Brandt ...................... B32B 5/18 428/218
2012/0117903 A1* 5/2012 Wedi ....................... E04C 2/288 52/309.4
2012/0125450 A1* 5/2012 Krusec ................ E04D 13/1693 137/357
2012/0141673 A1* 6/2012 Koester ................. B29C 44/461 427/244
2012/0177865 A1* 7/2012 Zhou ....................... E04B 1/762 428/68
2013/0029550 A1* 1/2013 Seth ...................... B32B 27/285 156/244.11
2013/0055669 A1* 3/2013 Olszewski ................ E04B 1/14 52/794.1
2013/0143061 A1* 6/2013 Zhou ....................... B32B 3/266 428/608
2013/0164524 A1* 6/2013 Letts ....................... B32B 27/40 428/319.3
2013/0318911 A1* 12/2013 Sealock .................. E04C 2/243 428/71
2014/0130435 A1* 5/2014 Paradis ................... E04C 2/296 156/60
2014/0194020 A1* 7/2014 Vliet ..................... C04B 24/085 428/221
2015/0040503 A1* 2/2015 Tackett ................... E04D 11/02 52/309.4
2015/0225881 A1* 8/2015 Paradis .................... D04H 5/04 156/60
2015/0352806 A1* 12/2015 Faotto ..................... B32B 37/12 428/688
2016/0068648 A1* 3/2016 Miller ................... B29C 44/352 521/146
2016/0145779 A1* 5/2016 Teng ....................... E04C 2/043 442/330
2016/0264787 A1* 9/2016 Dubey .................... B32B 13/08
2016/0361892 A1* 12/2016 Ciuperca ................. E04B 1/762
2017/0306628 A1* 10/2017 Simonis .................. B32B 25/08
2017/0362835 A1* 12/2017 Nielsen ..................... B32B 7/12
2017/0368792 A1* 12/2017 Faotto ....................... B32B 5/18
2018/0361712 A1* 12/2018 Nandi ................. B32B 37/0038
2019/0292773 A1* 9/2019 Gombar .................. E04B 1/806
2020/0109570 A1 4/2020 Nielsen et al.
2020/0123776 A1* 4/2020 Leatherman ............ B32B 5/245
2020/0284447 A1* 9/2020 Brubaker ................ F24F 13/20
2021/0078310 A1* 3/2021 Faotto ........................ B32B 7/12
2021/0301439 A1* 9/2021 Wu ...................... D04H 1/4209

FOREIGN PATENT DOCUMENTS

CN 1288991 A * 3/2001 ............... B32B 3/30
CN 101220696 A * 7/2008
CN 201746947 U * 2/2011
CN 201874162 U * 6/2011
CN 102505556 A * 6/2012
CN 204826267 U * 12/2015
CN 105440302 A * 3/2016
DE 2713487 A * 9/1978 ............. B29C 70/00
DE 3508933 A * 10/1986 ............. B32B 13/02
DE 3508933 A1 * 10/1986 ........... C08G 18/482
DE 4214335 A1 * 11/1993 ......... B28B 23/0006
DE 19940423 A1 * 4/2001 ............. E04B 1/762
DE 20005948 U1 * 8/2001 ............. B32B 27/32
DE 202004005399 U1 * 9/2004 ............. B32B 27/12
DE 202005002358 U1 * 6/2005 ............... A47K 3/40
DE 102004023921 A1 * 9/2005 .............. E04F 15/02
DE 202007008309 U1 * 9/2007 ............. B32B 29/00
DE 202007007371 U1 * 10/2007 ............ E03F 5/0408
DE 102007003787 A1 * 7/2008 ............... B32B 5/02
DE 102007013918 A1 * 8/2008 ............... E04C 2/22
DE 102008005423 A1 * 7/2009 ............. B32B 5/022
DE 102010000600 A1 * 10/2010 ............... B32B 5/02
DE 202016004149 U1 * 10/2016 ............. E04C 2/284
EP 609721 A2 * 8/1994 ............. B29C 44/04
EP 1236566 A1 * 9/2002 ......... B28B 19/0092
EP 1582622 A2 * 10/2005 ............. B32B 27/12
EP 1582652 A2 * 10/2005 .............. E04F 15/02
EP 1790451 A1 * 5/2007 ........... B29C 44/326
EP 2230075 A1 * 9/2010 ........... D06N 7/0002
EP 2333180 A1 * 6/2011 ............. B32B 17/02
EP 3628482 A1 * 4/2020 ........... B32B 19/047
FR 2573460 A * 5/1986 ............. E04C 2/205
FR 2573460 A1 * 5/1986 ........... B32B 15/046
FR 2617220 A3 * 12/1998 ........... B32B 15/046
GB 2055326 A * 3/1981 ............. B32B 27/08
GB 2338682 A * 12/1999 ............. B29C 44/32
GB 2432555 A * 5/2007 ........... B29C 44/326
GB 2437370 A * 10/2007 .............. E04F 15/18
GB 2518055 A * 3/2015 ............. B32B 5/022
JP 61272138 A * 12/1986 .............. E04F 15/18
JP 01198336 A * 8/1989
JP 09310284 A * 12/1997
JP 2002086460 A * 3/2002 ............. B29C 44/32
JP 2011068117 A * 4/2011
JP 2020051174 A * 4/2020 ............ E03F 5/0408
KR 741311 B1 * 8/2007
KR 2013073273 A * 7/2013
KR 2016031095 A * 3/2016 ............. B32B 27/12
WO WO-8300840 A1 * 3/1987 .............. E04F 15/02
WO WO-9322118 A1 * 11/1993 ......... B28B 23/0006
WO WO-9714730 A1 * 4/1997 ........... C08G 18/482
WO WO-03018934 A1 * 3/2003 ............... A47K 3/40
WO WO-2009051575 A1 * 4/2009 ........... B32B 15/046
WO WO-2010145928 A1 * 12/2010 ........... B28B 19/003
WO WO-2021142337 A1 * 7/2021 ............... B32B 3/08

OTHER PUBLICATIONS

Machine Translation of JP-01198336-A, Aug. 1989 (Year: 1989).*
Machine Translation of WO-2009051575-A1, Apr. 2009 (Year: 2009).*
Machine Translation of DE-102010000600-A1, Oct. 2010 (Year: 2010).*
Machine Translation of KR-2016031095-A, Mar. 2016 (Year: 2016).*
Emert, FM's VSH Testing—Very Severe Hail, Feb. 2020 (Year: 2020).*

* cited by examiner 400
404
402
404
402
404
406
402
408
410
404
402
404
402
404
404
414
412
416

NON-WICKING UNDERLAYMENT BOARD

CROSS REFERENCE TO RELATED APPLICATION(S)

This application is a continuation-in-part of U.S. patent application Ser. No. 16/893,624, entitled "NON-WICKING UNDERLAYMENT BOARD," filed Jun. 5, 2020, which is incorporated herein by reference in its entirety for all purposes.

BACKGROUND OF THE INVENTION

External walls and roofs of structures as well as internal walls where moisture is likely to contact, such as shower stalls, are typically tiled, lined with cultured marble, or covered with another durable waterproof material. External walls and roof structures typically have multiple layers of material to provide impact resistance that are installed sequentially in layers. The walls of the structures should be capable of preventing moisture transfer through the wall to preserve the structural integrity of the wall and prevent damage. Typical systems require specialized skills, tools, materials, and processes to install and can lead to discomfort for installers as a result of working with fiberglass mats while installing.

SUMMARY OF THE INVENTION

A non-wicking underlayment board for moisture resistant applications in commercial and residential environments including interior walls, high moisture contact areas such as shower stalls, exterior walls, and roofing structures. One general aspect includes a non-wicking underlayment board, including a foam core layer having a compressive strength greater than one hundred and fifty pounds per square inch to resist impacts and prevent rupture upon impact by another object and a thickness in a range of between 3.175 mm (⅛ inch) to 106 mm (4 inches). The non-wicking underlayment board also includes a reinforcement layer coextensive with the foam core layer and integrally formed within the foam core layer. The non-wicking underlayment board also includes a first and second low-wick outer facing layer coextensive with and positioned on opposite faces of the foam core layer, the outer facings including a material having a tensile strength of greater than one hundred pounds per linear inch to resist rupture upon impact by another object and each including mineral-coated nonwoven fibers and having a thickness in a range of between 0.15 mm (0.0059 inches) to 0.3 mm (0.0118 inches), where the mineral-coated nonwoven fibers prevent wicking of liquid and is compatible with mortar and adhesive.

Another general aspect includes a non-wicking underlayment board, including a foam core layer having a compressive strength greater than one hundred pounds per square inch and a thickness in a range of between 3.175 mm (⅛ inch) to 101.6 mm (4 inches). The non-wicking underlayment board also includes a reinforcement layer coextensive with the foam core layer and integrally formed within the foam core layer, the reinforcement layer including a material having a tensile strength of at least one hundred pounds per linear inch. The non-wicking underlayment board also includes a first outer facing layer coextensive with and positioned on a first face of the foam core layer, the first outer facing layer including mineral-coated nonwoven fibers and having a thickness in a range of between 0.15 mm (0.0059 inches) to 0.3 mm (0.0118 inches), where the mineral-coated nonwoven fibers prevent wicking of liquid and is compatible with mortar and adhesive. The non-wicking underlayment board also includes a second outer facing layer coextensive with and positioned on a second face of the foam core layer, the second outer facing layer including mineral-coated nonwoven fibers and having a thickness of greater than 0.3 mm (0.118 inches).

Another general aspect includes a method of manufacturing a non-wicking underlayment panel, including forming a fiberglass scrim. The method also includes adhering the fiberglass scrim to a first polyester facing, the polyester facing having a tensile strength of at least one hundred pounds per linear inch. The method also includes applying a mineral coating to a side of the first polyester facing opposite the fiberglass scrim. The method also includes applying a mineral coating to a side of a second polyester facing. The method also includes positioning the second polyester facing spaced apart from the first polyester facing, the side of the first polyester facing positioned opposite the second polyester facing and the fiberglass scrim facing the second polyester facing. The method also includes filling a void between the first polyester facing and the second polyester facing with a closed cell foam having a compressive strength of at least one hundred and fifty pounds per square inch. Other embodiments of this aspect include corresponding devices and systems each configured to perform the actions of the methods.

DETAILED DESCRIPTION

Figure 1:
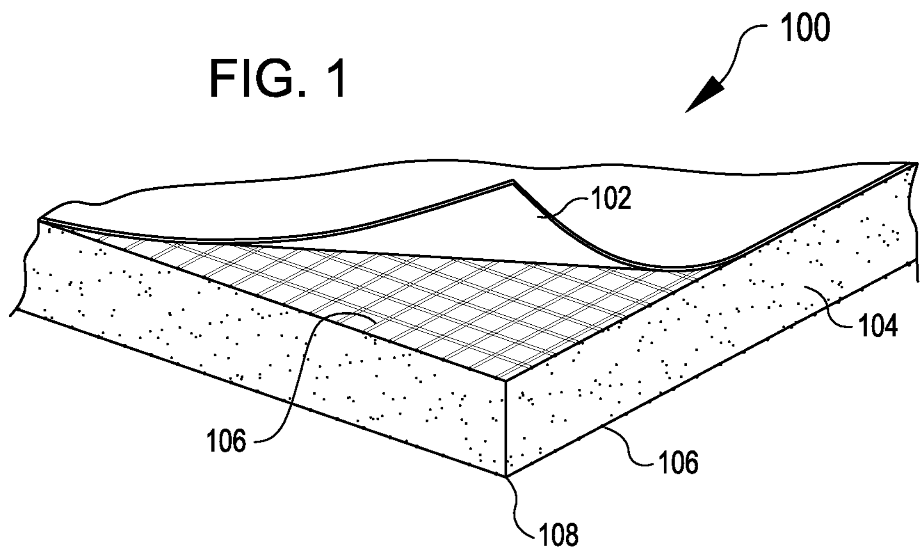
FIG. 1 illustrates a cross-section view of a non-wicking underlayment board including integral reinforcements.

Composite tile underlayment boards of various compositions, sizes, thicknesses and slopes are commonly used to construct waterproof and water resistant substrates for both interior and exterior applications including bathrooms, interior wet areas, exterior walls functioning as air and water barriers with bondable outer surfaces serving as substrates for exterior decorative veneers, tiles, and coatings, and roof structures, such as substrates or backings for roofing materials. To construct a waterproof substrate using composite building panels, typical systems include the use of sealants, sheet membranes, liquid membranes, tapes, and other means to waterproof boards, joints, and fastener penetrations. Cementitious boards and gypsum composite boards typically require waterproofing over their entire surfaces while some foam composite boards only require waterproofing joints and fastener penetrations. For foam composite boards, joints typically require gapping with some sort of waterproofing method that prevents water wicking through the outer facing or surface of the board, especially under hydrostatic pressure. Additional steps required for waterproofing or introducing air gaps as well as additional material required increase the overall cost of a waterproof installation.

Embodiments described herein enable efficient construction of water resistant and waterproof walls and enclosures for commercial and residential applications, such as exterior walls and shower enclosures. The non-wicking underlayment board enables efficient construction of walls by providing a non-wicking and/or waterproof barrier incorporated within an underlayment board. In typical systems an underlayment board is used to enclose a wall and subsequently a non-wicking or waterproof barrier is applied on top of the underlayment board. Additional care must be taken at seams of underlayment boards to maintain non-wicking properties and ensure the wall is sufficiently water resistant. The non-wicking barrier in typical systems often includes a fiberglass mat that can cause itching or discomfort for installers as they have to work with the mat to apply it to the underlayment board. In the embodiments described herein, the non-wicking underlayment board can be easily installed because, unlike typical systems, there is little to no wicking at joints and seams of adjacent underlayment boards so underlayment boards need not be carefully spaced to prevent wicking and can instead abut one another for easier installation.

Embodiments described herein comprise composite underlayment boards having added mechanical strength resulting in improved impact resistance over typical underlayment. The added mechanical strength and impact resistance enables the use of such underlayment boards in environments and ways not possible with typical systems due to the lack of mechanical strength against impact of such typical systems. For example, the added mechanical strength may increase the impact resistance of underlayment boards. Also, pneumatic fasteners may be used to attach cladding or other materials to the underlayment board without tearing through the outer facing of the underlayment board. Such pneumatic fasteners, or other impact-driven fasteners, are often driven with relatively high air pressure to secure them into wood studs which may have varying densities and hardnesses. Using typical underlayment systems, the air pressure of pneumatic systems must be reduced to prevent the fasteners from rupturing the underlayment, which also results in inconsistent fastener depth when installed, which is undesirable and may result in additional time and work during installation. By enabling pneumatic fasteners to be installed at higher air pressures and wider ranges of air pressures, such as, for example, in a range of up to seventy pounds per square inch or higher, installers do not need to worry about rupturing the top facing when installing nails and/or staples with pneumatic tools. Furthermore, fastener depth can be controlled more precisely since the higher air pressure overcomes variations in wood stud density.

The benefits described above with respect to impact resistance may enable the use of efficient and fast installation methods, especially on large exterior walls, interior floors, exterior patio floors, and roofing structures. The benefits of the underlayment board as described herein are further illustrated with respect to fastener holding strength, as defined by ASTM D1037, as well as lateral resistance, as defined by ASTM D1761, in which underlayment boards produced with equivalent foam density show a one hundred percent or more increase in each of the holding strength and lateral resistance with the addition of the reinforcement layers described herein. Such benefits not only enable the use of pneumatic fastener systems but also simplify robotic fastener installations, which may use pneumatic fastener drivers for installations on both wood and steel structural elements. Additional benefits include impact resistance against hammer impacts during installation that further prevent damage to the underlayment board during installation when compared against typical systems.

The underlayment board described herein is lightweight, non-wicking, quick to install and waterproof as defined by ASTM E331, ANSI A118.10 and ASTM D4026, Annex 2 each of which are presented in Table 1. Based on the requirements listed in Table 1, the waterproof underlayment system can resist twenty-four inches of hydrostatic pressure for at least forty-eight hours without leaking or wicking water behind the system into the wall cavity. The non-wicking underlayment board can also function as an air barrier as defined by ASTM E2178 and ASTM E2357. To ensure the underlayment board can achieve the required performance, the foam composite underlayment board is designed to minimize wicking while maintaining compatibility with all types of adhesives including mortars typically used to install ceramic, porcelain and natural stone tiles.

Table 1 below gives preferred properties for polyisocyanurate foam panels, in accordance with embodiments of the underlayment board. However, it well be understood that these properties are given as examples only, and that panels having other properties may be used.

| Shear Strength (Under conditions required in ANSI A118.10) | |
|---|---|
| 7 day shear strength: | >50 psi |
| 7 day water immersion shear strength: | >50 psi |
| 28 day shear strength: | >50 psi |
| 100 day water immersion shear strength: | >50 psi |
| Waterproofness; ASTM D4068/ANSI A118.10 | Pass |
| Waterproofness of Assembly (ASTM E331) | Passed, assembly (complete system) |

Turning now to the figures, FIG. 1 illustrates a cross-section view of a non-wicking underlayment board 100 including integral reinforcements. The non-wicking underlayment board 100 is formed of a foam core 104, a first outer facing 102, a second outer facing 108, and reinforcement layers 106. The non-wicking underlayment board 100 can be provided in a thickness of between one-eighth of an inch to over four inches. The non-wicking underlayment board 100 can be provided in any suitable length or width, for example having a four foot width and an eight foot length.

Figure 4:
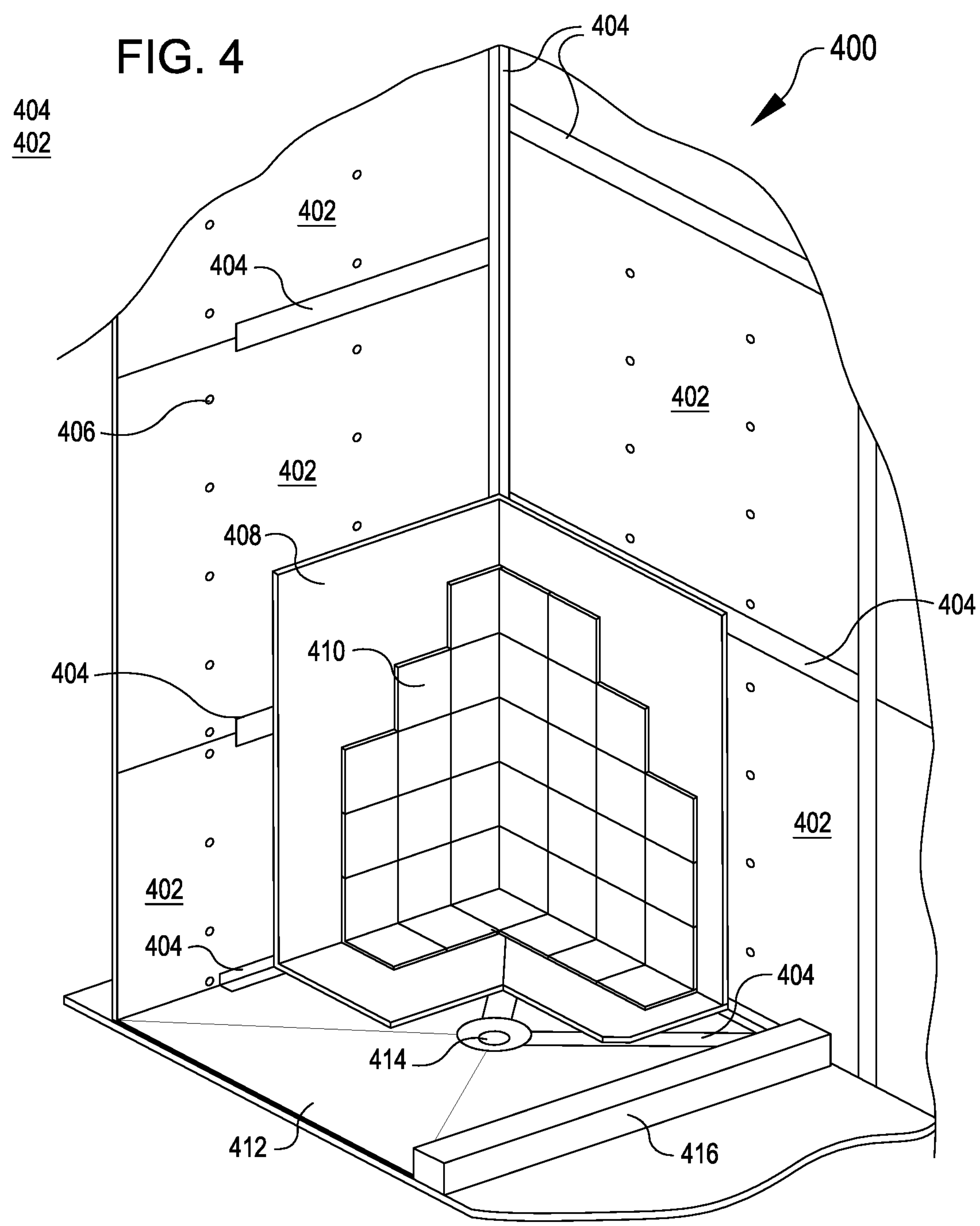
FIG. 4 illustrates an example shower installation using a non-wicking underlayment board.
Figure 5:
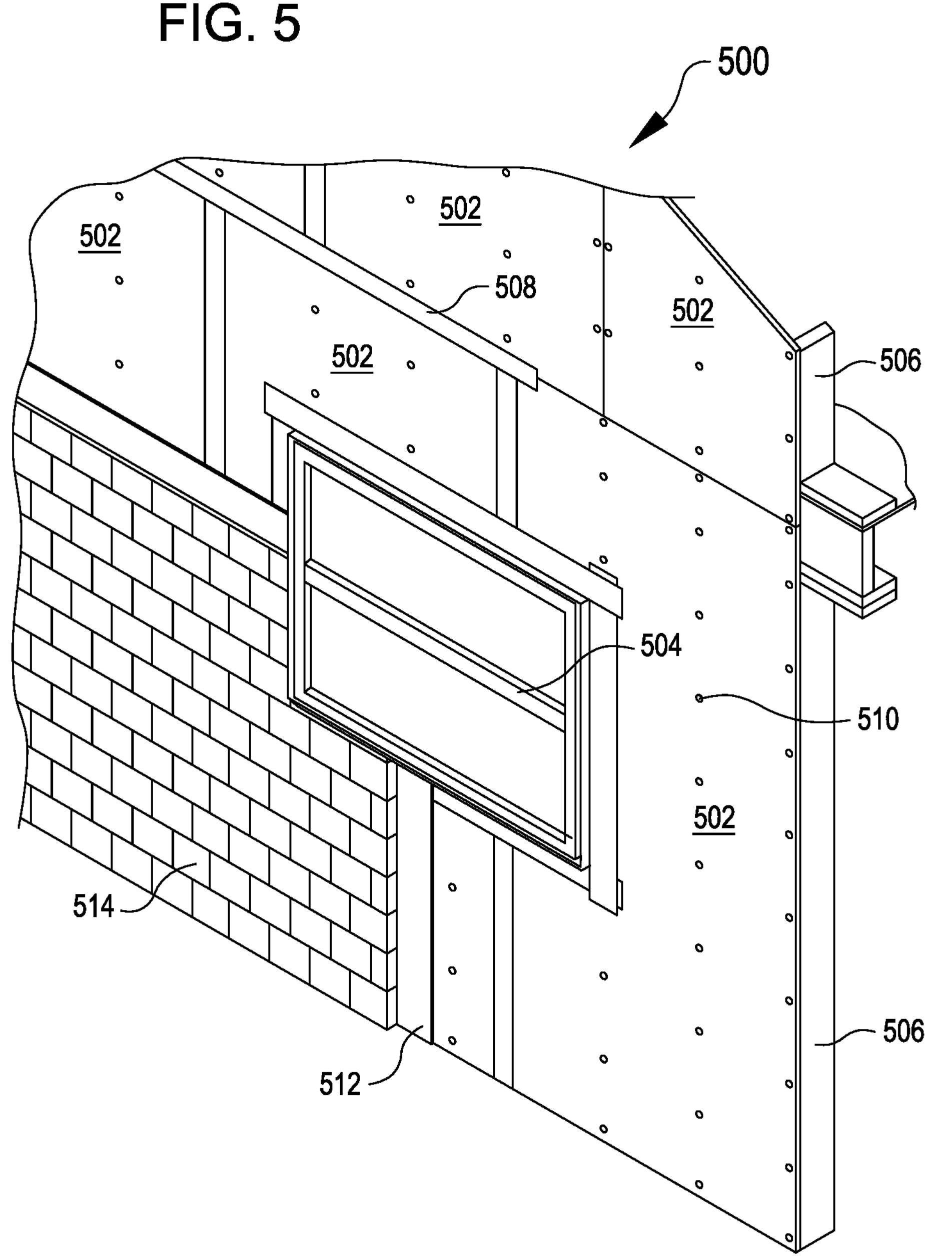
FIG. 5 illustrates an example exterior wall panel installation using a non-wicking underlayment board.

The non-wicking underlayment board 100 includes a foam core 104 formed of a closed-cell foam. The closed-cell foam can be a polystyrene, polyisocyanurate, polyurethane or other such closed-cell foam core with sufficient compressive strength for an intended use. In an example, flooring applications typically require higher compressive strengths than wall or ceiling applications. The foam core 104 may have a density of about 1.0 lb/ft$^3$ or more, for example 1.0 to 12.0 lb/ft$^3$, or preferably about 2.5 to 6 lb/ft$^3$. In an example, for vertical installations, the closed-cell foam used in the foam core 104 may have a compressive strength greater than twenty pounds per square inch (PSI) or in another example greater than two hundred PSI in order to provide sufficient stiffness and rigidity for installation directly to vertical studs of a wall structure, such as shown in FIGS. 4 and 5. Because cladding applied on top of the non-wicking underlayment board 100 is often rigid, such as tile, stone, ceramic, or other such materials, deflection of the non-wicking underlayment board can result in cracking of finished surfaces, difficulty installing larger tiles and veneers and insufficient resistance to wind loads.

On horizontal surfaces, such as flooring applications, especially where significant traffic and rolling loads are expected, much higher compressive strengths are required. For residential and light commercial applications, compressive strengths of two hundred and fifty PSI or greater is typically required to ensure the overlaying tile or cladding installation does not crack or deteriorate over time. Composite flooring materials that are more flexible and resilient may not require the non-wicking underlayment board to feature such higher compressive strengths. Other mechanical properties like flexural strength, fastener holding strength, tensile strength, shear bond strength, lateral fastener resistance and impact resistance are all improved with increasing the compressive strength of the foam core 104.

The first outer facing 102 includes a thin layer of a fiber nonwoven material saturated or coated with a mineral based coating. The first outer facing 102 has a thickness of between 0.15 mm to 0.3 mm. The fiber nonwoven material is a glass or polymeric fiber nonwoven material. The mineral based coating may be any mineral based coating useful in construction and bonding with cementitious adhesives, one exemplary mineral based coating may include magnesium oxide or limestone. In some examples, the mineral based coating may be an acrylic based adhesive. The first outer facing 102 produces a non-wicking barrier due to the lightweight nonwoven material. Additionally, the mineral based or acrylic based coating enables mortar adhesion to the first outer facing 102 but provides a low or non-wicking surface to which a tile or other such material may be adhered.

The first outer facing 102 is compatible with sealants, adhesives, and seam tapes suitable for use in various environments, including those described with respect to FIGS. 4 and 5, for example polyurethane, STPE, MS polymer, acrylic and silicone based sealants and adhesives, as well as acrylic, butyl and SBS based adhesives and seam tapes. In addition, at first outer facing 102 is compatible with thinset mortars and other tile or stone setting adhesives used to install ceramic, porcelain, natural stone, or other kinds of tile.

The second outer facing 108 may be identical to the first outer facing 102 and may include the same fiber nonwoven material and mineral based coating. In some examples, such as described in FIG. 3 below, the second outer facing 108 may be formed of a different material, include a different material, or be formed into a different thickness than the first outer facing 102. This may be advantageous for isolation of cracks or movement in a substrate beneath or behind the non-wicking underlayment board 100. The first outer facing 102 and the second outer facing 108 are shown parallel with one another. In some embodiments, the first outer facing 102 and the second outer facing 108 may be at an angle with respect to one another, for example when installing a shower pan as shown and discussed in FIG. 4.

The non-wicking underlayment board 100 includes a reinforcement layer 106 encapsulated within the foam core 104. One exemplary material that may be used for the reinforcement layer 106 is a fiberglass scrim. Other examples of reinforcing materials may include blends of polymeric and fiber glass scrim, fiber glass nonwovens, polymeric nonwovens and blends of fiberglass and polymeric nonwovens. The thickness of the reinforcement layer 106 may vary based on the strength properties of the non-wicking underlayment board 100. For example, in applications requiring greater strength and rigidity, such as beneath a tile floor where high traffic is expected, the reinforcement layer may be thicker. Additionally, the selection of material for the reinforcing layer may be based on the ultimate properties of the non-wicking underlayment board 100. For example, in applications where high fastener holding strength is needed (such as where a large load may be applied to a vertical panel, fiberglass scrim or fiberglass nonwoven reinforcing materials will provide greater fastener holding strength and flexural strength than reinforcing materials having lower tensile strengths. Conversely, if flexibility is required for a particular application, lighter weight and lower tensile strength reinforcements can be used for the reinforcement layer 106.

The reinforcement layer 106 is encapsulated within the foam core 104 such that the reinforcement layer 106 is integral with the foam core 104 as well as with the outer facings. The reinforcement layer 106 is depicted as present on both opposing faces of the foam core 104, though in some examples the reinforcement layer 106 may only be included on a single face, such as only on the same side as the first outer facing 102. The reinforcement layer 106 is encapsulated within the foam core 104 by expanding the components of the foam core 104 in a void between the first outer facing 102 and the second outer facing 108, with the reinforcement layers 106 positioned in between the outer facings. The reinforcement layers 106 are depicted adjacent and in contact with the outer facings. In some examples the reinforcement layers 106 may be positioned at varying depths within the foam core 104, for example the reinforcement layers 106 may be in the center of the foam core 104 in addition to or in place of the reinforcement layers 106 at the edges of the foam core 104.

Due to the construction of the non-wicking underlayment board 100, with the non-wicking outer facing and foam core 104 formed of closed cell foam, fastener penetrations do not require additional topical waterproofing and the non-wicking underlayment boards 100 can be tightly butted together and sealed with a wide variety of seam tapes. Because of the self-sealing fastener penetrations and the use of peel and stick seam tapes over board joints, the non-wicking underlayment board 100 enables the creation of a underlayment system that can be bonded to or tiled immediately after installation without requiring drying time for an intermediate adhesive thereby saving labor and materials. Other methods of sealing joints are also possible due to the universal compatibility of the described foam composite board with sealants, adhesive, thin set mortars and other materials commonly used for reinforcing and sealing joints between non-wicking underlayment boards 100.

Joints and gaps between adjacent non-wicking underlayment boards 100 are sealed with a suitable tape or sealant, or a combination of sealing mechanisms, producing a fully waterproof installation preferably compliant with ANSI A118.10 and IAPMO PS-106. While any workable sealants or tapes may be used, a preferred sealant is polyurethane STPE or MS polymer caulk. A preferred seam tape is 2" wide polymer-coated alkali-resistant fiber glass mesh tape 2" wide waterproof peel and stick acrylic tape. Joints may also be coated with a liquid waterproofing membrane. In some embodiments, the sealant may be GoBoard® Sealant available from Johns Manville. Though typical or previous systems may require a gap between adjacent boards, embodiments as described herein may be positioned adjacent one another without any gap left between the boards and the installation still maintains waterproof properties.

The non-wicking underlayment board 100 is formed through a series of steps. The series of steps may be performed in the order presented below, or may be presented in a different order, as will be apparent to those with skill in the art.

The first step for forming the non-wicking underlayment board 100 is to form a scrim of fibers, such as fiberglass, polymer fibers, or other fibers as presented above. The scrim may be formed and rolled and subsequently unrolled when the non-wicking underlayment board 100 will be formed. The scrim is also coated, with an acrylic based adhesive as described herein.

The non-wicking underlayment board 100 is formed next by applying the scrim to a first outer facing 102. The first outer facing 102 is a layer of polymer fiber or glass fiber nonwovens saturated with mineral based coatings. The mineral based coating includes a ground limestone or other mineral product, an acrylic binder, additives, and water. The mineral based coating is applied at a rate of between 4 to 10 grams per square foot, or more preferably between 5 to 6 grams per square foot. In some embodiments, such as when the first outer facing 102 or the second outer facing 108 is substantially thicker, the coating application rate may increase to ensure sufficient coating of the nonwovens. The first outer facing 102 has a thickness of between 0.15 mm to 0.3 mm. The non-wicking underlayment board 100 may also include a second outer facing 108, the second outer facing may be identical to the first outer facing 102, but in some examples, such as in FIG. 3 below. The first outer facing 102 and the second outer facing 108 are formed such that the nonwovens have a weight of between 34 to 50 grams per square meter (3.2 to 4.7 grams per square foot).

The first outer facing 102 and the second outer facing 108 are spaced apart to the ultimate final width of the non-wicking underlayment board 100. The reinforcement layers 106 are positioned adjacent the first outer facing 102 and the second outer facing 108. The void between the first outer facing 102 and the second outer facing 108 may be filled with a closed cell foam to form the foam core 104. The foam core 104 is formed by mixing reactant chemicals to form the structure of the foam core 104 which sets between the first outer facing 102 and the second outer facing 108 to form the foam core 104. The foam core 104 encapsulates, partially or fully, the reinforcement layers 106, capturing the reinforcement layers 106 and bonding the layers together. In some examples, the foam core 104 may encapsulate or adhere additional reinforcement layers 106 or other layers such as impervious barriers or other such materials as part of the non-wicking underlayment board 100. The foam core 104 expanding from between the reinforcement layers 106 and the facings results in the closed cell foam penetrating into the nonwoven fibers of the facings to thereby reduce any possible wicking of moisture across the board. The non-wicking underlayment board 100 is finally cut to final size after the foam core 104 has set.

Figure 2:
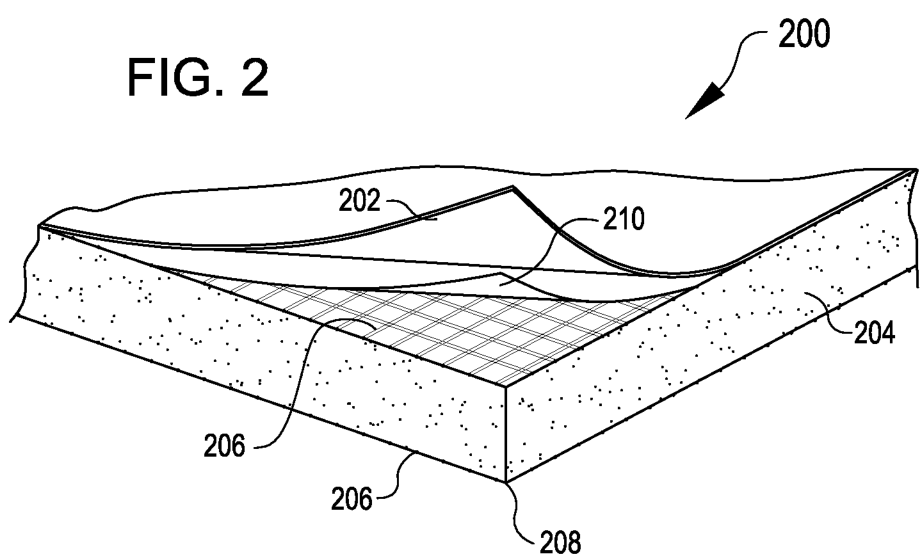
FIG. 2 illustrates a cross-section view of a non-wicking underlayment board including an impervious barrier layer for preventing moisture transfer across the underlayment board.

FIG. 2 illustrates a cross-section view of a non-wicking underlayment board 200 including an impervious barrier layer 210 for preventing moisture transfer across the underlayment board. The non-wicking underlayment board 200 includes a first outer facing 202 which may be identical to the first outer facing 102 as well as a foam core 204 and a second outer facing 208 that may both be identical to the foam core 104 and the second outer facing 108. For applications requiring extremely low permeability, such as in steam showers, the reinforcement layer 206 may be similar to the reinforcement layer 106 or may also include an impervious barrier layer 210.

The impervious barrier layer 210 may include a thin polyester or similar type film compatible with the underlying foam core 204. The impervious barrier layer 210 may be positioned between the first outer facing 202 and the foam core 204. The impervious barrier layer is preferably positioned between the reinforcement layer 206 and the first outer facing 202 such that the reinforcement layer 206 may still be encapsulated within the foam core 204.

Figure 3:
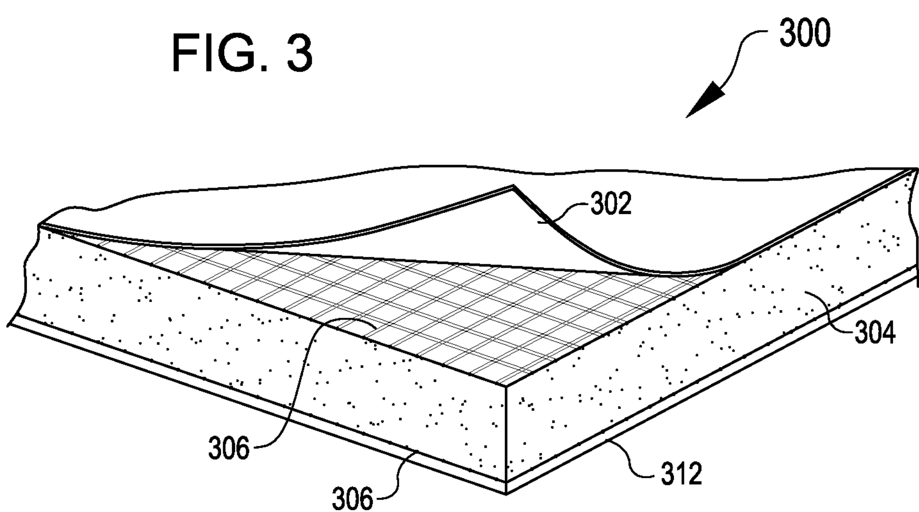
FIG. 3 illustrates a cross-section view of a non-wicking underlayment board including a crack or movement isolation layer.

FIG. 3 illustrates a cross-section view of a non-wicking underlayment board 300 including a crack or movement isolation layer 312. The non-wicking underlayment board 300 may be substantially similar to the non-wicking underlayment boards 100 and 200 described with respect to FIGS. 1 and 2 and include a first outer facing 302, reinforcement layers 306, foam core 304 all identical to the components shown and described with respect to FIGS. 1 and 2.

Applications requiring crack resistance for tile installations will require one side of the non-wicking underlayment board 300 to be faced with a thicker polymeric fiber nonwoven to isolate the underlying slab or subfloor movement from the overlaying tile or applied surface. The movement isolation layer 312 may prevent damage or transferal of motion or swelling from the underlying surface through to the applied layer of tile, cladding, or other material. The movement isolation layer 312 has a thickness of greater than 0.3 mm, such that the movement isolation layer 312 is able to prevent transferring motion, cracks, or changes in the shape of the supporting surfaces, to a certain degree, to prevent damage to the applied cladding. The waterproofing characteristics of the non-wicking underlayment board 300 are achieved with the first outer facing 302. In some examples, an impervious barrier layer may be included between the first outer facing 302 and the reinforcement layer 306. When installed, the movement isolation layer 312 is installed facing the substrate, such as a slab, floor joist, wall studs, and other such supporting surfaces. Both the first outer facing 302 and the movement isolation layer 312 are compatible with cementitious and non-cementitious mortars, sealants, and fasteners used to install boards in residential and commercial construction.

As with the embodiments described with respect to FIGS. 1 and 2, the non-wicking functionality is achieved through the use of the lightweight nonwoven material of the outer facings and the thin coating on the same. When installed, the non-wicking outer facings absorb some moisture to ensure good bonding strength with all types of mortars and adhesives but not enough water to promote wicking across the underlayment board.

FIGS. 4 and 5 depict environments where the non-wicking underlayment boards as described in any of the embodiments herein may be use in constructing moisture resistant or waterproof barriers.

FIG. 4 depicts an installation of a shower stall 400 showing different layers of the installation including non-wicking underlayment boards 402. The non-wicking underlayment boards 402 are used to cover walls as well as the floor and the curb 416 of the shower stall 400 installation.

The walls of the shower stall 400 have been faced with non-wicking underlayment boards 402. The non-wicking underlayment boards 402 are secured directly to studs within the wall without the need to apply over another surface or to apply a waterproof coating over the top of the non-wicking underlayment board 402. The non-wicking underlayment boards 402 are shown with exposed fasteners 406 because the properties of the non-wicking underlayment board including the closed cell foam and the outer facings are self-sealing when using typical fasteners, such as screws. Adjacent non-wicking underlayment boards 402 abut one another without any gap left between them and seam tape 404 is applied to cover the seams between the boards. The seam tape may be any seam tape as described herein. In some embodiments, the seam tape includes a non-woven backing that is capable of bonding with a mortar or other adhesive 408 used to secure the tiles 410 to the walls.

The drain 414 in shower stall 400 is centered within the shower stall 400 however, some embodiments may accommodate many different drain positions. In this example, a round drain cover will be used, but square drain covers or covers of other shapes may be used in other embodiments.

Non-wicking underlayment boards 412 (sloped ¼" per foot or more) are shown forming the shower pan of the shower stall 400. The non-wicking underlayment boards are resting on floor joists and are adhered and/or fastened to subfloor may include shim or space material to provide a slope towards the drain 414. In some embodiments, a shower stall 400 may be installed over a concrete or other kind of floor, for example using a non-wicking underlayment board 300 as described with respect to FIG. 3 that is capable of isolating cracks in the concrete under the floor.

The floor area of shower stall 400 is conceptually divided into four regions, defined by the outer walls of shower stall 400 and by diagonal lines emanating from drain 414 towards the corners of the shower stall 400. Each of the four regions slopes towards the drain 414, and the slope may be accomplished by placing shims or using a shaped or sloped non-wicking underlayment board, such as one that is specially shaped with a wedge-shape and sloped to allow simple installation of shower pans. The seams are once again covered by the seam tape as described above.

Adjacent the shower pan, a curb 416 is installed to prevent water from flowing out of the shower region into a remainder of the interior space. The curb 416 is formed of one or more pieces of non-wicking underlayment boards. In one example, the curb 416 may have a thickness of up to four inches. A four inch thick non-wicking underlayment board may be cut to the desired length and width to produce the curb 416. Tiles may be adhered directly to the curb 416 rather than having to build a curb structure first, then waterproof the structure as is typically done. In some embodiments, the non-wicking underlayment used to form the curb 416 may be formed into a shape designed for curbs 416 rather than in a large sheet. The material may be formed with a near square cross section or such that the thickness and the width of the material are of approximately the same scale. The material used to form the curb 416, and indeed any non-wicking underlayment board described herein, may include additional outer facings on sides perpendicular to the first outer facing and the second outer facing. In this way, the curb 416 may have an outer facing compatible with a thin set mortar or other adhesive on all surfaces of the curb 416 such that installation of the curb simple requires cutting the material to length and applying adhesive and tile to the curb material.

In some examples, a curbless shower stall may be installed using the non-wicking underlayment board. A low-profile wedge that has a ⅛ inch thickness at one end and a ½ inch thickness at the other end. The surrounding area outside the shower pan may also be formed of ½ inch non-wicking underlayment board such that water within the region of the shower drains to the center of the shower pan. In some examples, the surrounding area outside the shower pan may be raised above the shower pan by around ½ inch through the use of additional or thicker subfloor in the surrounding area. This enables the use of a curbless shower stall that allows water to drain to the center of the shower pan.

Though described above with respect to the curb 416, the non-wicking underlayment board described herein may also be used to build other waterproof structures, such as shower benches, shelves, or other such features within the shower stall 400.

FIG. 5 illustrates an example exterior wall panel 500 installation using a non-wicking underlayment board 502. In the exterior wall panel 500, studs 506 and structural elements of the wall are shown at one end of the exterior wall panel 500 for purposes of illustrating that the non-wicking underlayment board 502 can be secured directly to the structure of the wall and a decorative stone 514 or other cladding can be applied directly to the non-wicking underlayment board 502. A window 504 can be accommodated by cutting the non-wicking underlayment boards 502 into the proper size to leave a window opening. In this embodiment, the non-wicking underlayment board serves as a shear panel and replaces the need to install sheathing to an exterior followed by a waterproof surface and followed by an adhesive compatible surface as is typically done. Though a decorative stone 514 is shown in the figure, adhered with a thin set mortar 512 compatible with the outer facing of the non-wicking underlayment board 502, other claddings can be installed including lap siding, stucco, coatings, tile, or any other suitable exterior wall facing material.

The non-wicking underlayment boards 502 are tightly jointed together, as would not be possible with typical materials due to moisture wicking that would occur at the joints. A seam tape 508 is applied over the joints to increase the waterproofing of the surface, the seam tape 508 preferably including a nonwoven fiber backing for compatibility with the thin set mortar 512 or other adhesive.

The use of the non-wicking underlayment board 502 in an exterior application substantially decreases the installation time for wall facing material. The non-wicking underlayment board 502 can be secured directly to the structure of the wall, such as studs 506 with mechanical fasteners, i.e., screws, and as described above with respect to FIG. 4, the material is self-sealing around the fasteners so seam tapes 508 can be applied immediately. Peel and stick seam tapes with nonwoven fiber backings adhere immediately and provide a surface to which the exterior facing, such as the decorative stone 514 can be applied without the need to wait for any previous work to dry or be waterproofed. As such, installation of exterior walls is substantially sped up by significantly reducing the number of required disparate elements and eliminating the need to wait for previous elements to dry or set before proceeding.

In some examples, the non-wicking underlayment board 502 also provides for impact resistance for exterior verticals wall applications, such as exterior wall panel 500. During installation, cladding materials are rarely installed immediately after exterior sheathing material is applied. During this construction time, the sheathing materials, such as the non-wicking underlayment board 502 resists weather including rain, wind-driven rain and debris, hail, and other such environmental conditions. The non-wicking underlayment board 502 functions as a sheathing because of the impact resistance described above, which may resist direct impacts during this construction phase, such as from hail, in addition to serving as an air and weather barrier.

In some further examples, the non-wicking underlayment board 502 may be provided as coverboards on roofing applications. The non-wicking underlayment boards 502 serve to protect underlying insulation as well as overlaid membranes from hail damage. For example, because of the impact resistance of the non-wicking underlayment board 502, any hail incident on the roof is prevented from rupturing the non-wicking underlayment board 502 and thereby also prevents rupturing of the overlaid membrane. The non-wicking underlayment board 502 having the low wicking characteristics provides additional water resistance against intrusion through an underlying roof system. For example, fastener penetrations through the underlayment board may resist twenty-four inches of hydrostatic pressure for forty-eight hours, per ASTM D4068. Additionally, joints between underlayment boards may be sealed with seam tapes or membranes. In this manner, damage due to leaks in an overlying roofing structure or element, may be mitigated until repairs are performed to the underlying structure, preventing additional structural damage.

In a specific example, a non-wicking underlayment board may have a thickness of one half inch and is capable of resisting hail impacts including hail of up to and exceeding two and one half inches without puncturing an overlaid membrane or damaging insulation covered by the non-wicking underlayment board. The impact resistance and performance of the board complies with FM 4470 Class 1-VSH (Very Severe Hail) tests where a two inch ice ball is launched to impact at one hundred and sixty feet per second.

In some examples, the impact resistance, such as resistance to hail, may further be improved by the compressive strength of the foam core, such as foam core 104, as well as the tensile strength of the reinforcement layer 106 and the outer facing 102. In some examples for Class 1-VSH compliance, the non-wicking underlayment board may have a compressive strength of the foam cores of one hundred and fifty pounds per square inch or more, and preferably two hundred pounds per square inch or more. The tensile strength of the outer facing may be greater than one hundred pounds per linear inch. In one example, the tensile strength of the reinforcement layer may be greater than twenty pounds per linear inch, or other cases greater than one hundred pounds per linear inch, in still other cases greater than two hundred pounds per linear inch, or higher. The foam core and outer facing may be selected to have such properties and thereby have impact resistance as described above.

In some examples, the non-wicking underlayment board may be used as a roofing substrate as well as insulation layer on which pavers, tile, and other such coverings may be laid for construction of patios, rooftop areas for foot traffic, and other such environments. The non-wicking underlayment board may be installed over a decking or roofing system and may be laid on a sloped surface, such as in pitched roofs, as well as low-sloped rooftop areas, such as rooftop patio areas. In such examples, similar to the shower stall 400 of FIG. 4, the underlayment board may be laid with a slope from one edge to another of the board so as to direct water to a drain as with conventional roofing materials and shower pans. In contrast to typical roofing structures, the non-wicking underlayment board may additionally support weight from dense materials, such as bricks or pavers being used for walking surfaces in rooftop patio situations. The enhanced mechanical strength provided by the structures described herein enable the underlayment board to be used with a wide range of floor covering options including stone, tile, vinyl, and any other suitable flooring materials.

In some examples, the underlayment board may be provided as a separation material or layer between overlying materials such as stone and tile and more fragile underlying materials. In this manner, the underlayment board may act as a buffer region to transition between such materials in a construction.

In some examples, the underlayment board may be coated with a flooring surface, for example applied directly to the outer facing, and installed over a variety of subfloor types including steel, wood, and concrete subfloors. The underlayment board may serve as an impact-resistant and economical flooring option compatible with many different situations as described herein. In some particular examples, the underlayment boards may enable use as a flooring solution in recreational vehicles, mobile homes, tiny homes, and any temporary or low-cost structures without compromising performance.

The invention has now been described in detail for the purposes of clarity and understanding. However, those skilled in the art will appreciate that certain changes and modifications may be practiced within the scope of the appended claims. It is to be understood that any workable combination of the features and capabilities disclosed above in the various embodiments is also considered to be disclosed.

What is claimed is:

1. A non-wicking underlayment board, comprising:

a foam core layer having a compressive strength greater than one hundred and fifty pounds per square inch and a thickness in a range of between 3.175 mm (⅛ inch) to 101.6 mm (4 inches);

a reinforcement layer coextensive with the foam core layer and integrally formed within the foam core layer, the reinforcement layer comprising a fiberglass scrim; and a first and second low-wick outer facing layer coextensive with and positioned on opposite faces of the foam core layer, each having a tensile strength of greater than one hundred pounds per linear inch and comprising mineral-coated nonwoven fibers and having a thickness in a range of between 0.15 mm (0.0059 inches) to 0.3 mm (0.0118 inches), wherein the mineral-coated nonwoven fibers prevent wicking of liquid and are compatible with mortar and adhesive.

2. The non-wicking underlayment board of claim 1, wherein the foam core layer comprises a closed cell foam having a compressive strength greater than two hundred and fifty pounds per square inch.

3. The non-wicking underlayment board of claim 1, wherein the foam core layer comprises a polysicocyanurate foam, a polystyrene foam, or a polyurethane foam.

4. The non-wicking underlayment board of claim 1, wherein the first and second low-wick outer facing layer each comprise glass fiber nonwovens.

5. The non-wicking underlayment board of claim 1, wherein the first and second low-wick outer facing layer each comprise polymeric fiber nonwovens.

6. The non-wicking underlayment board of claim 1, wherein the fiberglass scrim has a tensile strength of greater than one hundred pounds per linear inch.

7. The non-wicking underlayment board of claim 1, wherein the reinforcement layer comprises a polyester film compatible with the foam core layer.

8. The non-wicking underlayment board of claim 1, wherein the non-wicking underlayment board resists twenty-four inches of hydrostatic pressure for a time period of forty-eight hours.

9. The non-wicking underlayment board of claim 1, further comprising an impervious layer positioned between the foam core layer and at least one of the first low-wick outer facing layer or the second low-wick outer facing layer.

10. The non-wicking underlayment board of claim 9, wherein the impervious layer comprises a polyester film or a polyethylene terephthalate (PET) film having a thickness less than 0.3 mm.

11. The non-wicking underlayment board of claim 1, wherein the non-wicking underlayment board resists an impact of a two inch ice ball traveling at one hundred and sixty feet per second without rupturing.

12. A non-wicking underlayment board, comprising:

a foam core layer having a compressive strength greater than one hundred pounds per square inch and a thickness in a range of between 3.175 mm (⅛ inch) to 101.6 mm (4 inches);

a reinforcement layer coextensive with the foam core layer and integrally formed within the foam core layer, the reinforcement layer comprising a material having a tensile strength of at least one hundred pounds per linear inch;

a first outer facing layer coextensive with and positioned on a first face of the foam core layer, the first outer facing layer comprising mineral-coated nonwoven fibers and having a thickness in a range of between 0.15 mm (0.0059 inches) to 0.3 mm (0.0118 inches), wherein the mineral-coated nonwoven fibers prevent wicking of liquid and are compatible with mortar and adhesive; and a second outer facing layer coextensive with and positioned on a second face of the foam core layer, the second outer facing layer comprising mineral-coated nonwoven fibers and having a thickness of greater than 0.3 mm (0.118 inches).

13. The non-wicking underlayment board of claim 12, wherein the second outer facing layer is configured for isolating movement adjacent the second outer facing layer.

14. The non-wicking underlayment board of claim 12, further comprising an impervious layer positioned between the foam core layer and at least one of the first outer facing layer or the second outer facing layer.

15. The non-wicking underlayment board of claim 14, wherein the impervious layer comprises a polyester film or a polyethylene terephthalate (PET) film having a thickness less than 0.3 mm.

* * * * *

UNITED STATES PATENT AND TRADEMARK OFFICE

CERTIFICATE OF CORRECTION

PATENT NO. : 11,685,140 B2
APPLICATION NO. : 17/194464
DATED : June 27, 2023
INVENTOR(S) : Duane Paradis It is certified that error appears in the above-identified patent and that said Letters Patent is hereby corrected as shown below:

In the Claims

Column 12, Lines 45-47 should read:
3. The non-wicking underlayment board of claim 1, wherein the foam core layer comprises a polyisocyanurate foam, a polystyrene foam, or a polyurethane foam.

Signed and Sealed this
Twenty-sixth Day of September, 2023

Katherine Kelly Vidal

Katherine Kelly Vidal
*Director of the United States Patent and Trademark Office*